(12) United States Patent
Austin et al.

(10) Patent No.: US 8,685,870 B2
(45) Date of Patent: Apr. 1, 2014

(54) EXTENSIBLE ABSORBENT COMPOSITES

(75) Inventors: Jared A. Austin, Greer, SC (US); Samuel C. Baer, Greenville, SC (US)

(73) Assignee: Fitesa Nonwoven, Inc., Simpsonville, SC (US)

( * ) Notice: Subject to any disclaimer, the term of this patent is extended or adjusted under 35 U.S.C. 154(b) by 834 days.

(21) Appl. No.: 11/676,831

(22) Filed: Feb. 20, 2007

(65) Prior Publication Data

US 2007/0197117 A1 Aug. 23, 2007

Related U.S. Application Data

(60) Provisional application No. 60/775,133, filed on Feb. 21, 2006.

(51) Int. Cl.
*B32B 5/06* (2006.01)
*B32B 5/26* (2006.01)
*D04H 1/00* (2006.01)

(52) U.S. Cl.
USPC .......................... 442/389; 442/381; 442/414

(58) Field of Classification Search
USPC ............ 428/152, 182, 283, 284, 297; 28/104
See application file for complete search history.

(56) References Cited

U.S. PATENT DOCUMENTS

| | | | |
|---|---|---|---|
| 3,708,831 A | 1/1973 | Burger | |
| 4,100,324 A | 7/1978 | Anderson et al. | |
| 4,116,892 A | 9/1978 | Schwarz | |
| 4,153,664 A | 5/1979 | Sabee | |
| 4,209,563 A | 6/1980 | Sisson | |
| 4,223,063 A | 9/1980 | Sabee | |
| 4,285,100 A | 8/1981 | Schwarz | |
| 4,443,513 A | 4/1984 | Meitner et al. | |
| 4,606,964 A | 8/1986 | Wideman | |
| 4,652,487 A | 3/1987 | Morman | |
| 4,655,760 A | 4/1987 | Morman et al. | |
| 4,657,802 A | 4/1987 | Morman | |
| 4,663,220 A | 5/1987 | Wisneski et al. | |
| 4,692,371 A | 9/1987 | Morman et al. | |
| 4,720,415 A | 1/1988 | Vander Wielen et al. | |
| 4,781,966 A | 11/1988 | Taylor | |
| 4,784,892 A | 11/1988 | Storey et al. | |
| 4,789,699 A | 12/1988 | Kieffer et al. | |
| 4,803,117 A | 2/1989 | Daponte | |
| 4,803,118 A | 2/1989 | Sogi et al. | |
| 4,863,779 A | 9/1989 | Daponte | |

(Continued)

FOREIGN PATENT DOCUMENTS

EP 0 333 209 9/1989
EP 0 333 212 9/1989

(Continued)

OTHER PUBLICATIONS

International Search Report and Written Opinion mailed Jun. 18, 2007 for PCT/US2007/062441 (Filed Feb. 20, 2007).

(Continued)

*Primary Examiner* — Jennifer Chriss
*Assistant Examiner* — Ricardo E Lopez
(74) *Attorney, Agent, or Firm* — Alston & Bird LLP

(57) ABSTRACT

Absorbent sheet materials are produced from a coformed blend of absorbent fibers and extensible meltblown polymer fibers. Laminates of these extensible coforms are prepared with layers of extensible polymeric fibers or filaments. The absorbent sheet materials are incrementally stretched to improve softness and drape.

26 Claims, 11 Drawing Sheets

(56) References Cited

U.S. PATENT DOCUMENTS

| | | | |
|---|---|---|---|
| 4,879,170 A * | 11/1989 | Radwanski et al. | 442/329 |
| 4,891,258 A | 1/1990 | Fahrenkrug | |
| 4,906,513 A | 3/1990 | Kebbell et al. | |
| 4,939,016 A * | 7/1990 | Radwanski et al. | 428/152 |
| 4,965,122 A * | 10/1990 | Morman | 442/328 |
| 4,981,747 A | 1/1991 | Morman | |
| 5,028,289 A | 7/1991 | Rasmussen | |
| 5,114,781 A | 5/1992 | Morman | |
| 5,116,662 A | 5/1992 | Morman | |
| 5,143,679 A | 9/1992 | Weber et al. | |
| 5,156,793 A | 10/1992 | Buell et al. | |
| 5,167,897 A | 12/1992 | Weber et al. | |
| 5,226,992 A | 7/1993 | Morman | |
| 5,292,582 A | 3/1994 | Gibbs et al. | |
| 5,316,837 A | 5/1994 | Cohen | |
| 5,332,613 A | 7/1994 | Taylor et al. | |
| 5,336,545 A | 8/1994 | Morman | |
| 5,385,775 A | 1/1995 | Wright | |
| 5,492,753 A | 2/1996 | Levy et al. | |
| 5,514,470 A | 5/1996 | Haffner et al. | |
| 5,540,976 A | 7/1996 | Shawver et al. | |
| 5,560,793 A | 10/1996 | Ruscher et al. | |
| 5,562,645 A | 10/1996 | Tanzer et al. | |
| 5,582,903 A | 12/1996 | Levy et al. | |
| 5,628,097 A | 5/1997 | Benson et al. | |
| 5,643,396 A | 7/1997 | Rajala et al. | |
| 5,660,657 A | 8/1997 | Rajala et al. | |
| 5,681,645 A | 10/1997 | Strack et al. | |
| 5,695,868 A | 12/1997 | McCormack | |
| 5,762,840 A | 6/1998 | Tsai et al. | |
| 5,789,065 A | 8/1998 | Haffner et al. | |
| 5,814,390 A | 9/1998 | Stokes et al. | |
| 5,855,999 A | 1/1999 | McCormack | |
| 5,882,769 A | 3/1999 | McCormack et al. | |
| 5,883,028 A | 3/1999 | Morman et al. | |
| 5,910,224 A | 6/1999 | Morman | |
| 5,914,084 A | 6/1999 | Benson et al. | |
| 5,962,112 A | 10/1999 | Haynes et al. | |
| 5,993,432 A | 11/1999 | Lodge et al. | |
| 6,028,018 A | 2/2000 | Amundson et al. | |
| 6,114,263 A | 9/2000 | Benson et al. | |
| 6,362,389 B1 | 3/2002 | McDowall et al. | |
| 6,368,444 B1 | 4/2002 | Jameson et al. | |
| 6,383,431 B1 | 5/2002 | Dobrin et al. | |
| 6,506,329 B1 | 1/2003 | Curro et al. | |
| 6,589,892 B1 | 7/2003 | Smith et al. | |
| 6,670,521 B2 | 12/2003 | Noda et al. | |
| 6,680,265 B1 | 1/2004 | Smith et al. | |
| 6,726,870 B1 | 4/2004 | Benson et al. | |
| 6,811,638 B2 | 11/2004 | Close et al. | |
| 6,896,843 B2 | 5/2005 | Topolkaraev et al. | |
| 6,932,929 B2 | 8/2005 | Krautkramer et al. | |
| 6,946,413 B2 | 9/2005 | Lange et al. | |
| 7,438,707 B2 * | 10/2008 | Bushman et al. | 604/385.22 |
| 2002/0165516 A1 * | 11/2002 | Datta et al. | 604/385.16 |
| 2003/0049987 A1 | 3/2003 | Close et al. | |
| 2003/0114067 A1 | 6/2003 | Matela et al. | |
| 2003/0200636 A1 | 10/2003 | Morman et al. | |
| 2003/0200991 A1 | 10/2003 | Keck et al. | |
| 2003/0203694 A1 | 10/2003 | Deka et al. | |
| 2003/0211802 A1 | 11/2003 | Keck et al. | |
| 2004/0121687 A1 | 6/2004 | Morman et al. | |
| 2004/0192147 A1 | 9/2004 | Smith et al. | |
| 2004/0222553 A1 | 11/2004 | Desai et al. | |
| 2005/0051276 A1 | 3/2005 | Close et al. | |
| 2005/0133151 A1 | 6/2005 | Maldonado Pacheco et al. | |
| 2005/0136772 A1 | 6/2005 | Chen et al. | |
| 2005/0148260 A1 | 7/2005 | Kopacz et al. | |
| 2005/0148261 A1 | 7/2005 | Close et al. | |
| 2005/0148262 A1 | 7/2005 | Varona et al. | |
| 2005/0241750 A1 * | 11/2005 | McCormack et al. | 156/229 |
| 2006/0003656 A1 | 1/2006 | Morman | |
| 2006/0003658 A1 | 1/2006 | Hall et al. | |
| 2006/0148358 A1 | 7/2006 | Hall et al. | |

FOREIGN PATENT DOCUMENTS

| | | |
|---|---|---|
| EP | 0 333 212 A2 | 9/1989 |
| JP | 2-26973 A | 1/1990 |
| JP | 3-501821 A | 4/1991 |
| JP | 2000-514883 A | 11/2000 |
| JP | 2003-073967 A | 3/2003 |
| JP | 2005-524001 A | 8/2005 |
| JP | 2007-530310 A | 11/2007 |
| WO | WO 90/04060 A2 | 4/1990 |
| WO | WO 98/03713 A1 | 1/1998 |
| WO | WO 99/37841 | 7/1999 |
| WO | WO 2005/065932 A1 | 7/2005 |
| WO | WO 2005/066405 | 7/2005 |
| WO | WO 2005/110748 | 11/2005 |

OTHER PUBLICATIONS

Office Action for Japanese Application No. 2008-556513 dated Jun. 17, 2011.

* cited by examiner

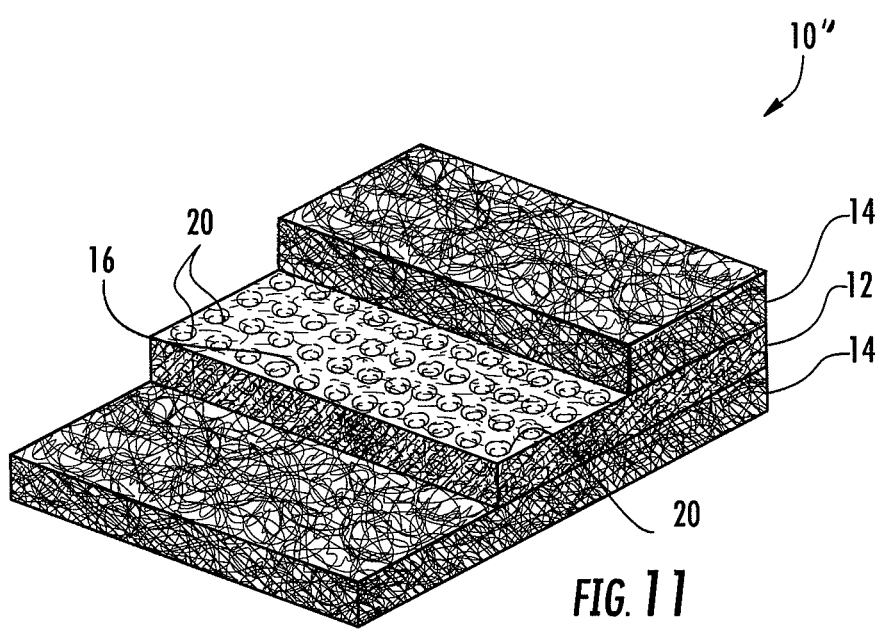

EXTENSIBLE ABSORBENT COMPOSITES

CROSS REFERENCE TO RELATED APPLICATION

This application is related to and claims priority from U.S. Provisional patent application No. 60/775,133 filed Feb. 21, 2006, which is incorporated herein by reference.

BACKGROUND OF THE INVENTION

Fibrous nonwoven materials and fibrous nonwoven composite materials are widely used in disposable wipers. Several methods are used for producing these fibrous nonwoven materials. In one approach, called air laid, wood fibers are bonded together into a web using an adhesive emulsion. This web must be dried to remove the water and set the adhesive. The resulting web tends to be stiff, due to the presence of the adhesive that binds all of the fibers.

Another approach, called spunlacing, employs jets of high velocity water to mechanically interlock the fibers in the web. This process commonly uses staple fibers and wood fibers as components in the web. Continuous filaments produced by the spunbond process can also be combined with wood fibers in the spunlacing process. Because adhesive is not commonly used in the spunlacing process, the fibers have substantial freedom to bend and twist, and the resulting webs are soft and drapeable. However, synthetic fibers are significantly more expensive than wood fibers and the spunlacing process has high capital and operating costs.

A third approach used to prepare absorbent nonwovens is to form a blend of absorbent fibers and synthetic fibers produced by the meltblowing process. This type of pulp-polymer integrated composite, called coform, consists of an air formed matrix comprising meltblown microfibers having an average diameter of less than 10 microns, and a multiplicity of individualized absorbent fibers such as, for example, wood pulp fibers, disposed throughout the matrix of polymer microfibers and engaging at least some of the microfibers to space the microfibers apart from each other. The absorbent fibers are interconnected by and held captive within the matrix of microfibers by mechanical entanglement of the microfibers with the absorbent fibers, the mechanical entanglement and interconnection of the microfibers and absorbent fibers alone forming a coherent integrated fibrous structure. These materials are prepared according to the descriptions in U.S. Pat. No. 4,100,324 to Anderson et al. Patents describing the use of coform nonwoven materials and composite fabrics incorporating coform layers include U.S. Pat. Nos. 4,663,220; 4,784,892; 4,906,513; 5,952,251; 6,028,018; 6,946,413 and U.S. Patent Publication Application No. US 2005/0266760A1. Coform nonwovens have good absorbency properties and have been successfully used in the manufacture of absorbent wipes.

Coform has the advantage of combining relatively low cost raw materials with a process that is relatively low in capital cost. Because the meltblown fibers are thermoplastic, they can be used to strengthen the air formed matrix by thermal bonding. Heat embossing coform webs is commonly practiced.

A disadvantage of coform is that the composite tends to be stiff, and this stiffness is aggravated by heat embossing. One prior approach to addressing this disadvantage entails producing a composite incorporating a stretched elastic component bonded to one or more coform layers, as described for example in U.S. Pat. No. 6,946,413. After the bonding is complete, the tension on the elastic component is released, producing a soft, bulky stretch-bonded laminated fabric. Disadvantages of the stretch-bonded laminate approach include the high capital cost of the process and the high cost of the elastomer component.

SUMMARY OF THE INVENTION

The composite sheet material of the present invention is suitable for use in applications requiring absorbency. In its simplest form, the composite sheet material comprises a coformed blend of absorbent fibers and meltblown fibers that can be permanently elongated (extended) by tensile stress. The elongation of the meltblown fibers softens the composite and makes it more drapeable. The elongation of the meltblown fibers is accomplished by passing the composite sheet material through an incremental stretching process.

In some embodiments, the composite sheet material includes an additional (second) layer of extensible thermoplastic fibers. This additional layer can for example, be in the form of a nonwoven web of extensible fibers or filaments laminated to one surface of the extensible coform layer. The meltblown fibers in the extensible coform layer and the extensible fibers or filaments in the additional layer can be permanently elongated by tensile stress to provide a soft, drapeable laminate. The fibers or filaments in the additional layer provide additional strength to the composite sheet material. In still another embodiment, nonwoven layers of extensible fibers or filaments define the opposite exterior surface of the composite sheet material. In still another embodiment, the composite sheet material includes an additional coform layer containing absorbent fibers present on the opposite exterior surface of the composite sheet material and bonded to the layer of extensible fibers or filaments.

Methods for permanently incrementally elongating the fibers in a nonwoven web are well known. A process for pattern drawing webs is described in U.S. Pat. No. 4,153,664. A process for stretching incremental portions of a thermoplastic web is described in U.S. Pat. No. 4,116,892. The incremental stretching process was extended to nonwoven laminates in U.S. Pat. No. 5,167,897. The incremental stretching process was further refined to produce elastic like behavior in a non-elastic web by permanently elongating selected portions of the web. A process for elongating selected portions of a web is described in EP 0 991 803.

Examples of elastomeric coform have been described in the patent art. U.S. Pat. No. 4,663,220 describes a coform composite made using meltblown fibers from an ABA block copolymer elastomer. U.S. Pat. No. 4,803,117 describes a coform composite made using meltblown fibers from ethylene-vinyl copolymer elastomers.

In a number of advantageous embodiments of the invention, the web of extensible fibers comprises a spunbond web of randomly arranged thermoplastic polymeric filaments. The spunbond web may include a plurality of discrete thermal point bond sites bonding the filaments of the spunbond web to one another and also serving to bond respective layers of the composite sheet material together.

In some embodiments, the composite sheet material is incrementally stretched to permanently elongate the extensible meltblown fibers in the coform layer and the extensible fibers of the nonwoven web layer. The incremental stretching may produce discrete spaced apart incrementally stretched zones extending along one direction in which the extensible fibers have been permanently deformed and elongated, and wherein these incrementally stretched zones are separated by intervening longitudinally extending unstretched zones where the filaments are substantially undeformed.

In one particular embodiment, the composite sheet material of the present invention comprises a first coform layer containing a blend of absorbent wood pulp fibers and extensible thermoplastic meltblown fibers. This first coform layer has an interior surface and an exterior surface that forms an absorbent first exterior surface of the composite sheet material. An extensible spunbond nonwoven web of continuous filaments is bonded to the interior surface of the first coform layer. The continuous filaments comprise a blend of at least two polymers which are immiscible with one another and at least one additional polymer which is miscible or partially miscible with said immiscible polymers. A second coform layer containing a blend of absorbent wood pulp fibers and extensible thermoplastic meltblown fibers is provided having an interior surface bonded to the layer of continuous extensible filaments and an exterior surface forming an absorbent second exterior surface of the composite sheet material.

In another embodiment, the composite sheet material of the present invention comprises a coform of wood pulp fibers and extensible thermoplastic meltblown fibers. The extensible meltblown fibers comprise a blend of polypropylene homopolymer and polypropylene copolymer. In still another embodiment, the composite sheet material comprises a first coform layer containing a blend of wood pulp fibers and extensible thermoplastic meltblown fibers, with this first coform layer having an interior surface and an exterior surface that forms an absorbent first exterior surface of the composite sheet material. An extensible spunbond nonwoven web of continuous filaments is bonded to the interior surface of the first coform layer. The filaments of the spunbond web comprise sheath-core bicomponent filaments including a polyethylene sheath component and a polypropylene core component. A second coform layer containing a blend of wood pulp fibers and extensible meltblown fibers is provided, with the second coform layer having an interior surface bonded to the layer of continuous extensible filaments and an exterior surface that forms an absorbent second exterior surface of the composite sheet material.

The present invention also provides a number of methods of producing an extensible composite sheet material. This extensible composite material is well suited for use as an absorbent wipe. In one embodiment, the method comprises the steps of forming a coform layer containing absorbent fibers and extensible meltblown fibers, applying to one surface of the coform layer a layer of extensible thermoplastic fibers, and bonding the coform layer in intimate surface-to-surface contact to the layer of extensible thermoplastic fibers so that the coform layer defines an absorbent exterior surface of the composite sheet material. The method may include the further step of forming an additional coform layer containing absorbent fibers and bonding the additional coform layer in intimate surface-to-surface contact with an opposite side of said layer of continuous extensible filaments and bonded thereto so that the additional coform layer defines an opposite exterior surface of the sheet material. The method may include the further step of incrementally stretching the composite sheet material to elongate the fibers. The stretching may involve incrementally stretching by ring-rolling.

In a further aspect, another method includes forming a first coform layer on a moving collection surface by directing fiberized pulp into the path of freshly extruded polymeric thermoplastic fibers exiting a meltblowing die, directing the moving collection surface with the first coform layer thereon past a spunbond station and depositing a layer of freshly extruded continuous extensible filaments onto the coform layer, directing the moving collection surface with the first coform layer and the layer of continuous filaments from the spunbond station and past a coform station and forming a second coform layer on the layer of continuous filaments by directing fiberized pulp into the path of freshly extruded polymeric thermoplastic fibers exiting a meltblowing die, and bonding the first and second coform layers and the layer of continuous filaments together to form a composite sheet material. The method may also include incrementally stretching the composite sheet material to elongate the continuous filaments and meltblown fibers.

In some embodiments, the composite sheet material is incrementally stretched via deep embossing to permanently elongate the extensible meltblown fibers and the web of extensible fibers in the region of the embossments.

The present invention provides another method of composite sheet material suitable for use in absorbency applications. The method comprises the steps of forming a coform layer containing wood pulp fibers and then applying to both surfaces of the coform layer layers of continuous extensible filaments, and bonding the continuous extensible filaments in intimate surface to surface contact with the coform layer so that the coform layer defines the interior layer of the composite sheet material.

In a further aspect, the method includes forming a first layer of spunbond continuous thermoplastic filaments on a moving collection surface, directing the moving collection surface with the first continuous filament layer thereon past a coform station and depositing a coform layer on the continuous filament layer, directing the moving collection surface with the first continuous filament web and the coform layer past a second spunbond station, depositing a second layer of continuous thermoplastic filaments on the coform layer and the first layer of thermoplastic filaments, and then bonding the three layers together to form a composite sheet material. The method may also include incrementally stretching the composite sheet material to elongate the continuous filaments and meltblown fibers.

BRIEF DESCRIPTION OF THE DRAWINGS

Figure 1:
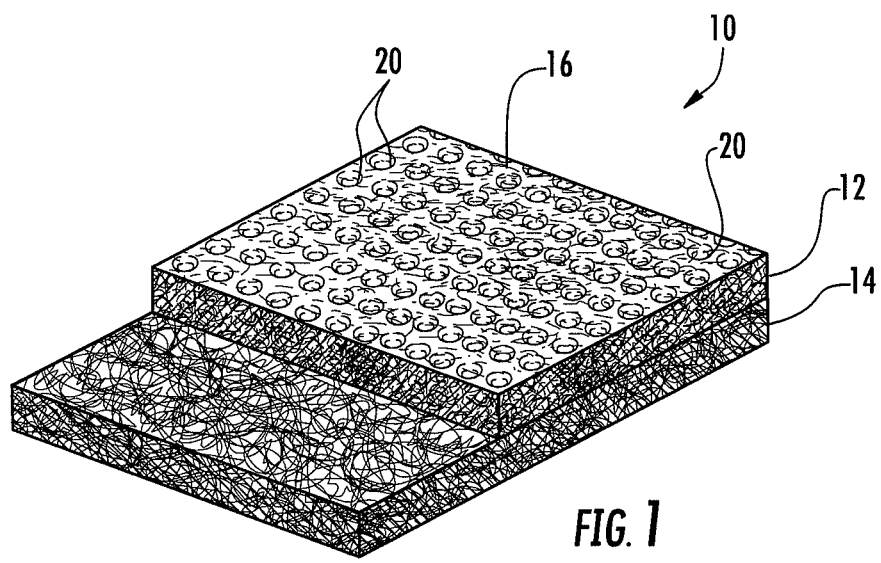

Having thus described the invention in general terms, reference will now be made to the accompanying drawings, which are not necessarily drawn to scale, and wherein:

FIG. 1 is a perspective view of a composite sheet material of the present invention wherein a layer of continuous extensible filaments is bonded to a coform layer.

Figure 2:
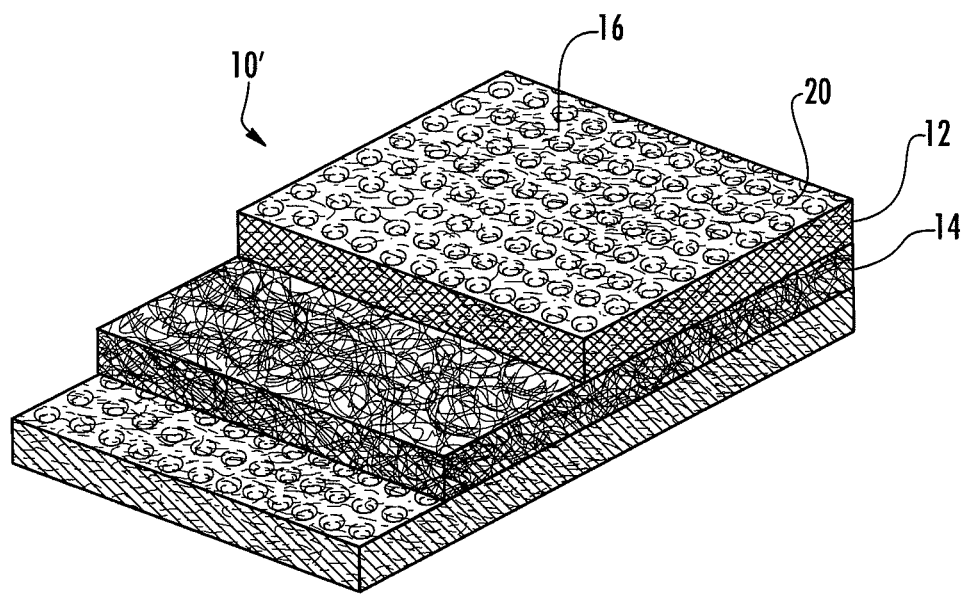
Figure 3:
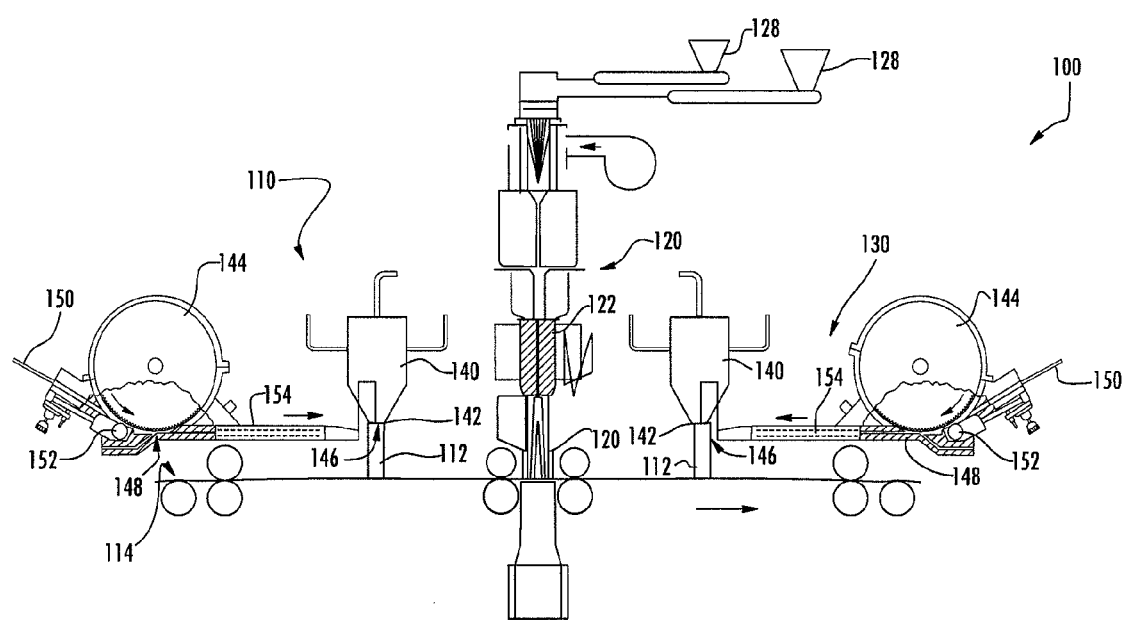
Figure 4:
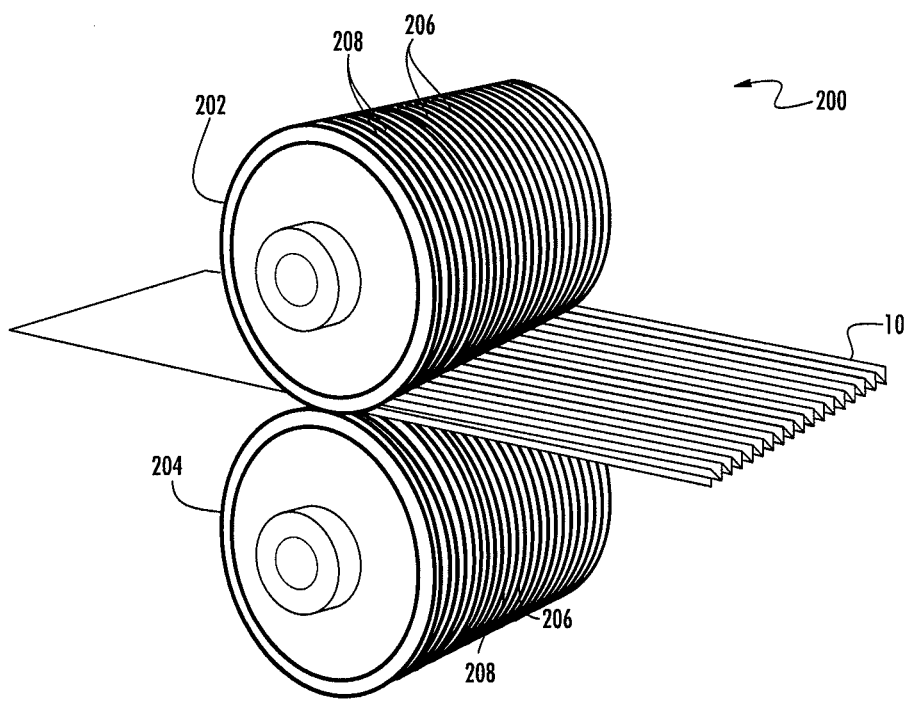
Figure 5:
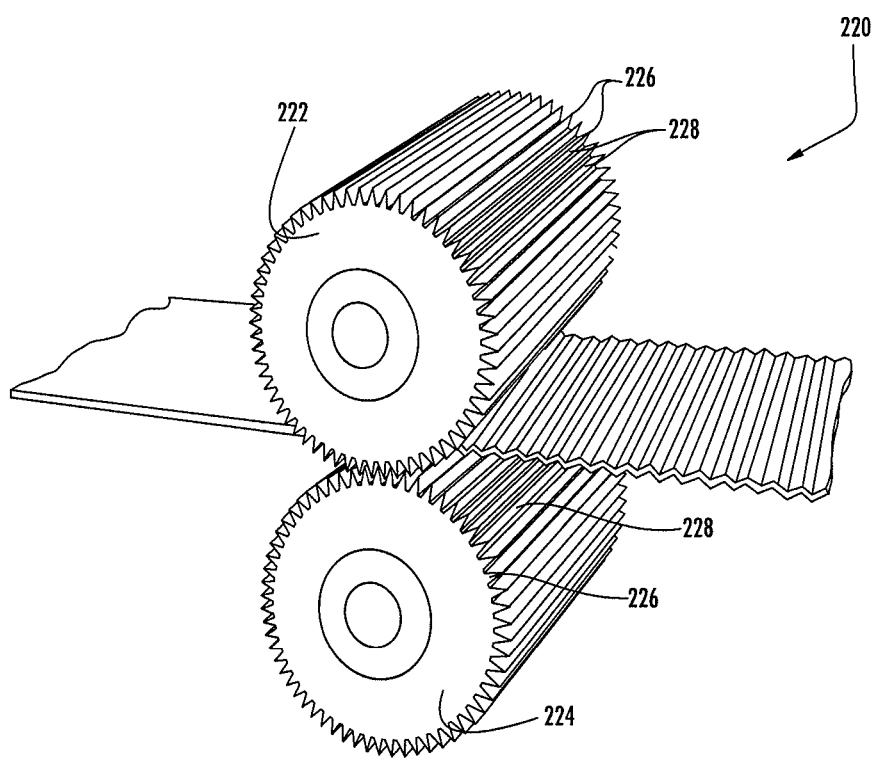
Figure 6:
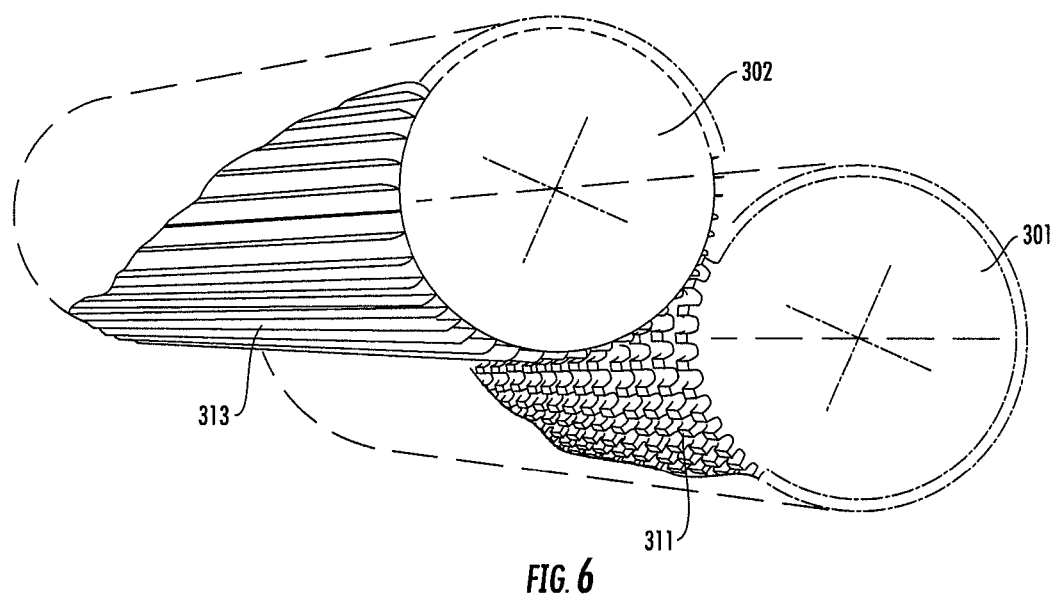
Figure 7:
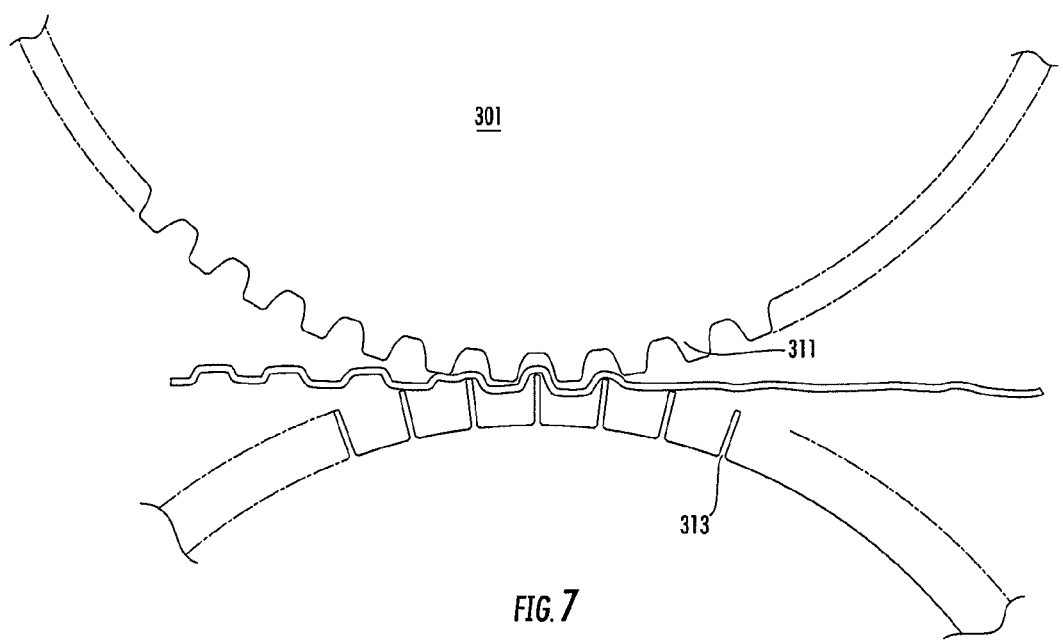
Figure 8:
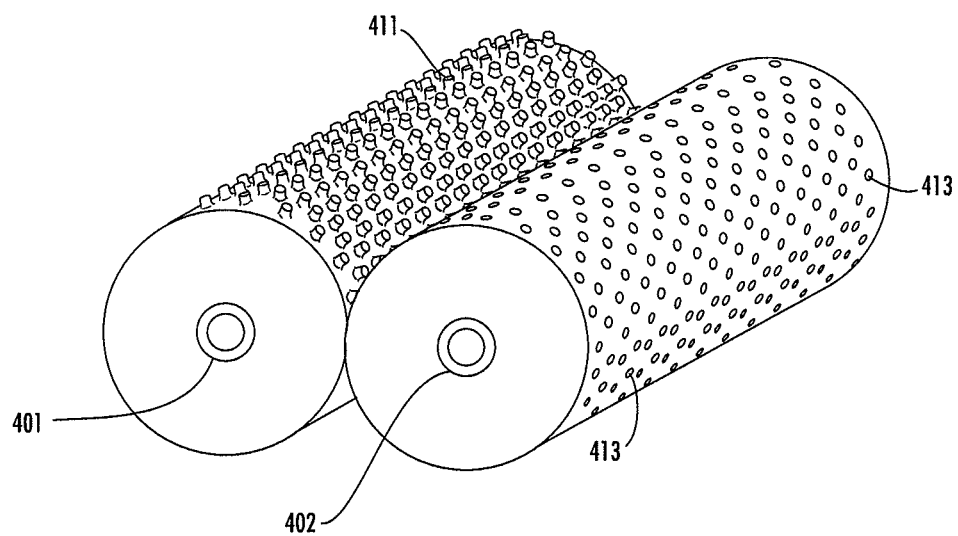
Figure 9:
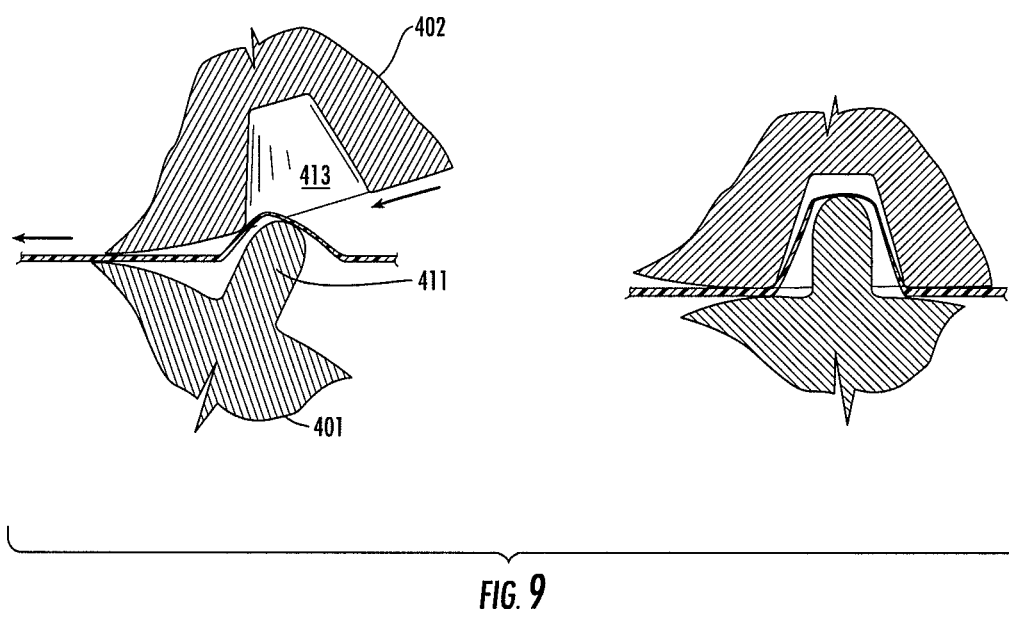
Figure 10:
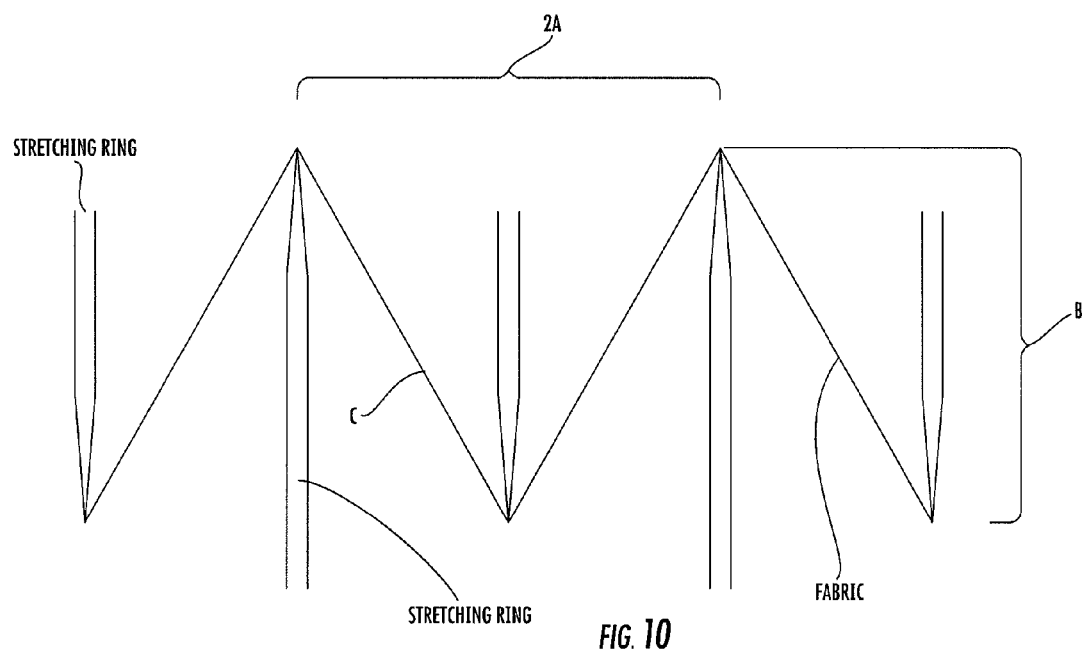

FIG. 2 is a perspective view of a composite sheet material of the present invention wherein a layer of continuous extensible filaments is disposed between two coform layers;

FIG. 3 is a schematic illustration of an apparatus for producing the composite sheet material of FIG. 2;

FIG. 4 illustrates an incremental stretching system in accordance with one aspect of the present invention;

FIG. 5 illustrates an incremental stretching system in accordance with another aspect of the present invention;

FIG. 6 illustrates an incremental stretching system in accordance with another aspect of the present invention;

FIG. 7 is a fragmentary cross-sectional view of the roll pair of FIG. 6;

FIG. 8 illustrates an incremental stretching system in accordance with yet another aspect of the present invention;

FIG. 9 is a fragmentary cross-sectional view of the roll pair of FIG. 8;

FIG. 10 is a schematic diagram showing how the percent elongation of a material can be measured using ring-rolling; and FIG. 11 is a perspective view of a composite sheet material of the present invention wherein outer spunbond nonwoven layers of continuous extensible filaments are disposed on opposite sides of an interior coform layer.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

For the purposes of the present application, the following terms shall have the following meanings:

The term "fiber" can refer to a fiber of finite length or a filament of infinite length.

The term "staple fiber" refers to a fiber of finite length.

As used herein the term "nonwoven web" means a structure or a web of material which has been formed without use of weaving or knitting processes to produce a structure of individual fibers or threads which are intermeshed, but not in an identifiable, repeating manner. Nonwoven webs have been, in the past, formed by a variety of conventional processes such as, for example, meltblown processes, spunbond processes, and staple fiber carding processes.

As used herein, the term "meltblown" refers to a process in which fibers are formed by extruding a molten thermoplastic material through a plurality of fine, usually circular, die capillaries into a high velocity gas (e.g. air) stream which attenuates the molten thermoplastic material and forms fibers, which can be to microfiber diameter. Thereafter, the meltblown fibers are carried by the gas stream and are deposited on a collecting surface to form a web of random meltblown fibers. Such a process is disclosed, for example, in U.S. Pat. No. 3,849,241 to Buntin et al.

As used herein, the term "spunbond" refers to a process involving extruding a molten thermoplastic material as filaments from a plurality of fine, usually circular, capillaries of a spinneret, with the filaments then being attenuated and drawn mechanically or pneumatically. The filaments are deposited on a collecting surface to form a web of randomly arranged substantially continuous filaments which can thereafter be bonded together to form a coherent nonwoven fabric. The production of spunbond non-woven webs is illustrated in patents such as, for example, U.S. Pat. Nos. 3,338,992; 3,692, 613, 3,802,817; 4,405,297 and 5,665,300. In general, these spunbond processes include extruding the filaments from a spinneret, quenching the filaments with a flow of air to hasten the solidification of the molten filaments, attenuating the filaments by applying a draw tension, either by pneumatically entraining the filaments in an air stream or mechanically by wrapping them around mechanical draw rolls, depositing the drawn filaments onto a foraminous collection surface to form a web, and bonding the web of loose filaments into a nonwoven fabric. The bonding can be any thermal or chemical bonding treatment, with thermal point bonding being typical.

As used herein, the term "microfibers" means small diameter fibers having an average diameter not greater than about 100 microns, for example, having an average diameter of from about 0.5 microns to about 50 microns, or more particularly, microfibers may have an average diameter of from about 4 microns to about 40 microns.

As used herein "thermal point bonding" involves passing a material such as two or more webs of fibers to be bonded between a heated calender roll and an anvil roll. The calender roll is typically patterned so that the fabric is bonded in discrete point bond sites rather than being bonded across its entire surface.

As used herein the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

The term "extensible", as used herein, means a material which, upon application of a tensile stretching force, becomes permanently elongated. A practical test for extensibility can be carried out using the incremental stretching apparatus described in FIG. 10. If a fabric can be elongated 150% beyond its original length in this apparatus without breaking, then it is extensible. After its removal from the incremental stretching apparatus, the fabric should exhibit at least a 15% reduction in its basis weight.

The term "extensible inelastic", as used herein, means a material which, upon application of a tensile stretching force, can be stretched beyond its elastic limit and becomes permanently elongated. The material has little retractive force and is therefore inelastic.

The term "incremental stretching" as used herein refers to a process in which a web is supported at closely spaced apart locations and then the unsupported segments of the web between these closely spaced apart locations are stretched. This can be accomplished by passing the web through a nip formed between a pair of meshing corrugated rolls, which have an axis of rotation perpendicular to the direction of web travel. Incremental stretching rolls designed for machine direction and cross direction stretching are described in U.S. Pat. No. 4,223,059, incorporated herein by reference. Another type of incremental stretching apparatus is described in U.S. Pat. No. 6,344,102 where one of the rolls includes a plurality of projections and the other roll includes blades that are received between the projections so that the web is incrementally stretched by deep embossing.

In one embodiment, the present invention provides a composite sheet material having one or more extensible coform layers that are attached to one or more layers of extensible fibers of a thermoplastic polymer, preferably in the form of a nonwoven web. The coform layer or layers provides an absorbent layer. The layer or layers of extensible fibers imparts additional strength to the coform layer(s). In one particular advantageous embodiment, the composite sheet material can be incrementally stretched to provide a sheet material having improved drape and a cloth-like feel while maintaining a desired level of strength and tear resistance.

Referring to FIG. 1, a composite sheet material, indicated by reference number 10, is illustrated. The composite sheet material 10 comprises at least one coform layer 12 that is attached to a layer 14 in the form of a web of extensible thermoplastic fibers. In the embodiment shown, the layer 14 of thermoplastic fibers is comprised of nonwoven web of substantially continuous filaments. However, in other embodiments, the layer 14 could comprise a web of staple fibers or a web of meltblown fibers. The outer coform layer 12 provides an exterior surface 16 of the composite sheet material.

FIG. 2 illustrates another embodiment of the invention wherein the composite sheet material, designated by reference number 10', comprises a layer 14 of substantially continuous extensible filaments disposed between two coform layers 12. However, in other embodiments, the layer 14 could comprise a web of staple fibers or a web of meltblown fibers. In the embodiment shown in FIG. 2, the two coform layers 12 are attached to opposite surfaces of the extensible filament layer 14 and define the exterior surfaces 16 of the composite sheet material. The coform layers 12 provide an exterior surface 16 to the composite sheet material that is absorbent and capable of retaining a desired volume of fluids.

The coform layer(s) 12 provide an outer absorbent surface for the composite sheet material. In one embodiment, the one or more coform layers comprise a gas-formed matrix of thermoplastic extensible meltblown microfibers, and absorbent cellulosic fibers, such as, for example, wood pulp fibers. As discussed previously, a coform layer is formed by initially forming at least one primary air stream containing the synthetic or polymeric fibers and merging the primary stream with at least one secondary stream of natural or cellulosic fibers. The primary and secondary streams are merged under turbulent conditions to form an integrated stream containing a thorough, homogeneous distribution of the different fibers. The integrated air stream is directed onto a forming surface to air-form the layer of material. A multiplicity of these coform layers can then be formed in succession to provide a web of multiple coform layers.

In one embodiment, the coform layer(s) 12 can have from 20-50 wt. % of polymer fibers and 80-50 wt. % of pulp fibers. A preferred ratio of polymer fibers to pulp fibers can be from 25-40 wt. % of polymer fibers and 75-60 wt. % of pulp fibers. A more preferred ratio of polymer fibers to pulp fibers can be from 30-40 wt. % of polymer fibers and 70-60 wt. % of pulp fibers. The most preferred ratio of polymer fibers to pulp fibers can be about 35 wt. % of polymer fibers and 65 wt. % of pulp fibers.

The meltblown polymer fibers of the coform layer(s) 12 may be produced from a wide variety of polymer compositions having good elongation capability, so that meltblown fibers produced the polymer composition will readily elongate when subjected to incremental tensile stress. Examples of suitable polymer compositions include polyethylene, blends of olefins, such as polypropylene, polyethylene or copolymers thereof with elastomeric polymers such as elastomeric polyolefins or styrenic elastomers. In one embodiment, the polymeric fibers of the coform layer comprise fibers of an extensible inelastic polymer composition.

A wide variety of absorbent fibers may be used in preparing the coform layer(s) 12. For example, digested cellulose fibers from softwood (derived from coniferous trees), hardwood (derived from deciduous trees) or cotton linters can be utilized. Fibers from Esparto grass, bagasse, kemp, flax, and other lignaceous and cellulose fiber sources may also be utilized. Other absorbent fibers include absorbent natural or synthetic fibers such as acrylic fibers or fibers made from regenerated cellulose, polyvinyl alcohol, polysaccharides or other absorbent fiber-forming compositions. For reasons of cost, ease of manufacture and disposability, preferred fibers are those derived from wood pulp (e.g., cellulose fibers).

Particulates that have unique functions may also be incorporated into the coform layer(s) 12. Particulates of superabsorbent polymer may be incorporated to increase water absorbency. Activated carbon particulate may be incorporated to facilitate removal of pollutants. Particles of ion exchange resins may also be incorporated.

According to one embodiment of the invention, the layer 14 is a thermally point bonded spunbond nonwoven web of randomly arranged substantially continuous filaments. The spunbond nonwoven web may be produced, for example, by the conventional spunbond process wherein molten polymer is extruded into continuous filaments which are subsequently quenched, attenuated mechanically by draw rolls or pneumatically by a high velocity fluid, and collected in random arrangement on a collecting surface. After filament collection, any thermal, chemical or mechanical bonding treatment may be used to form a bonded web such that a coherent web structure results. Preferably, the spunbond web is extensible and substantially inelastic. The web can be stretched, but the filaments are permanently elongated and do not have significant recovery of their prestretched dimension. Thus, the web has little retractive force (elastic recovery) and is therefore nonelastic.

The extensible spunbond web is formed from any of a number of available thermoplastic polymeric compositions formulated to provide highly extensible filaments that will elongate and stretch upon application of tensile force and which undergo permanent elongation, i.e. they are inelastic. For example, as described more fully in commonly owned U.S. Pat. No. 5,593,768, incorporated herein by reference, spunbond nonwoven webs having extensible inelastic filaments can be formed from multiconstituent fibers formed of a highly dispersed blend of at least two different thermoplastic polymers which are immiscible with one another and present as a dominant continuous phase and at least one noncontinuous phase dispersed therein. The filaments may additionally include at least one additional polymer which is miscible or partially miscible with said immiscible polymers. In one specific embodiment, the blend of immiscible polymers comprises a propylene polymer and polyethylene.

The extensible spunbond web can also be prepared from multicomponent filaments, in which two or more polymeric components are separated in distinct regions across the cross section of the filaments. A sheath-core bicomponent filament, with polyethylene in the sheath and polypropylene in the core is an example of such a filament.

The coform layer(s) 12 and the layer 14 of continuous extensible filaments can be bonded together to form a strong and coherent composite sheet material in a wide variety of ways. For example, the layers can be bonded together using thermal bonding, mechanical bonding, adhesive bonding and combinations thereof. Thermal bonding processes include hot calendering, belt calendering, oven bonding, ultrasonic bonding, radiant heat bonding, through-air bonding and the like. Area bonding and point bonding are two examples of thermal bonding that can be used to bond the composite sheet material.

In the embodiment shown in FIG. 1, the composite sheet material is bonded by plurality of intermittent bonds, indicated by the reference character 20. In this regard, thermal point bonding is most preferred. Various thermal point bonding techniques are known, with the most preferred utilizing calender rolls with a point bonding pattern. Any pattern known in the art may be used with typical embodiments employing continuous or discontinuous patterns. Preferably, the bonds 20 cover between 4 and 30 percent of the area of the web 10, more preferably 4 to 20 percent, and most preferably, 4 to 15 percent of the layer is covered. By bonding the web in accordance with these percentage ranges, the filaments are allowed to elongate throughout the full extent of stretching while the strength and integrity of the fabric is maintained.

With reference to FIG. 3, a method and apparatus for preparing a three layered composite sheet material, such as that illustrated in FIG. 2, is illustrated and broadly designated as reference number 100. The apparatus includes a first coform forming station 110 from which a coform web 112 is deposited onto a collection surface 114, such as endless foraminous moving belt. Next, a spunbond station 120 deposits a layer of continuous extensible filaments 122 onto the coform web 112. A second coform forming station 130 deposits a second coform layer onto the extensible continuous filament layer. After the second coform layer has been deposited, the layers can be bonded together to form the composite sheet material.

Each coform forming station 110, 130 comprises a meltblowing die 140 that is configured to provide a stream of meltblown microfibers 142 and a picker roll 144 that is configured to provide a stream of absorbent pulp fibers 146 that are introduced into the stream of meltblown microfibers. In one embodiment, the picker roll 144 may have a conventional arrangement wherein a plurality of teeth 148 are adapted to separate a mat or batt 150 of absorbent material into the individual absorbent fibers 146. The mat or batt of absorbent material 150 which is fed to the picker roll 144 may be a sheet of pulp fibers.

The sheets or mats 150 of absorbent material may be fed to the picker roll 144 by a roller arrangement 152. After the teeth 148 of the picker roll 144 have separated the mat of absorbent material 150 into separate absorbent fibers 146, the individual absorbent fibers are conveyed toward the stream of meltblown microfibers 142 through a nozzle 154. Gas is supplied in sufficient quantity to serve as a medium for conveying the absorbent fibers 146 through the nozzle 154. The gas may be supplied by any conventional arrangement such as, for example, an air blower (not shown). It is contemplated that additives and/or other materials may be added to or entrained in the gas stream to treat the absorbent fibers 146 or to provide desired properties in the resultant web.

As the molten polymer streams emerge from the meltblowing die 140, one or more streams of attenuating gas entrains and attenuates the molten polymer into fine fibers. The blend of polymer fibers and pulp fibers are deposited on the collection surface 114 to form the first coform layer. In an alternative embodiment, a previously formed coform layer can be combined with a previously formed spunbond nonwoven web formed of continuous filaments and bonded together to form a two-layer composite sheet material using thermal bonding, mechanical bonding, adhesive bonding or combinations of these.

In another alternative embodiment, a pre-formed two-layered composite sheet material comprising a coform layer and a layer of continuous extensible filaments may be provided via a roll onto which a second coform layer is deposited onto the layer of continuous extensible filaments.

The composite sheet material may be incrementally stretched by mechanically applying a tensile force against the composite sheet material in one or more directions. The stretching improves the overall drape and feel of the composite sheet material. In one embodiment, the composite sheet material may be stretched by passing the composite sheet material through one or more incremental stretching rollers. The activation process generally incrementally stretches the composite sheet material about 1.1 to 10.0 fold. In advantageous embodiments, the composite sheet material is stretched or drawn to about 2.5 times its initial length. Incremental stretching in accordance with the present invention may be accomplished by any means known in the art.

A number of different stretchers and techniques may be employed to stretch the composite sheet material. Incremental stretching can be accomplished using, for example, a diagonal intermeshing stretcher, cross direction ("CD") intermeshing stretching equipment, machine direction ("MD") intermeshing stretching equipment.

An exemplary configuration of one suitable incremental stretching system is shown in FIG. 4. The incremental stretching system 200 generally includes a pair of first 202 (e.g., top) and second 204 (e.g., bottom) stretching rollers positioned so as to form a nip. The first incremental stretching roller 202 generally includes a plurality of protrusions 206, such as raised rings, and corresponding grooves 208, both of which extend about the entire circumference of the first incremental stretching roller 202. The second incremental stretching roller 204 similarly includes a plurality of protrusions 206, such as raised rings, and corresponding grooves 208 which also both extend about the entire circumference of the second incremental stretching roller 204. The protrusions 206 on the first incremental stretching roller 202 intermesh with or engage the grooves 208 on the second incremental stretching roller 204, while the protrusions on the second incremental stretching roller 204 intermesh with or engage the grooves on the first incremental stretching roller 202. As the composite sheet material 10 passes through the incremental stretching system 200 it is subjected to incremental drawing or stretching in the cross machine ("CD") direction. In advantageous embodiments the protrusions are formed by rings, and the incremental stretching system is referred to as "ring-rolling."

Alternatively or additionally, the composite sheet material may be incrementally drawn or stretched in the machine direction ("MD") using one or more incremental stretching systems, such as provided in FIG. 5. As shown in FIG. 5, MD incremental stretching systems 220 similarly include a pair of incremental stretching rollers 222, 224 with intermeshing protrusions 226 and grooves 228. However, the protrusions and grooves within MD incremental stretching systems generally extend parallel to the axis of the roller across the width of the roller, rather than around its circumference. As the composite sheet material 10 passes through the incremental stretching system 220 it is subjected to incremental drawing or stretching in the machine ("MD") direction. Methods of incrementally stretching a sheet material are discussed in greater detail in U.S. Pat. No. 6,994,763.

Another type of stretching apparatus useful in the present invention is described in commonly owned U.S. Pat. No. 6,344,102. This apparatus includes a roll assembly comprising a cooperating pair of cylindrical rolls, as shown in FIG. 6. A first roll 301 includes a plurality of projections 311 that extend radially outwardly from the surface of the roll. The other roll 302 includes blades 313 extending radially outwardly from the surface of the roll and longitudinally across the width of the roll parallel to the rotational axis of the roll. The blades 313 intermesh with the projections 311 on the first roll, as shown in FIG. 7. As the composite sheet material passes between the rolls 301, 302, the material is driven by the blades into the recesses around the projections on the first roll 301. The extensible polymer fibers in the composite sheet material are incrementally elongated by deep embossing as they form around the projections, both softening and bulking the sheet material.

Another type of stretching apparatus useful in the present invention is described in commonly owned U.S. application Ser. No. 60/763,543 and is shown in FIG. 8 and includes a roll assembly comprising a pair of cylindrical rolls, 401, 402. A first roll 401 includes a plurality of projections 411 that extend radially outwardly from the surface of the roll and can have a generally cylindrical or tapered truncated frustoconical shape. The other roll 402 includes radially oriented recesses 413 correspondingly positioned opposite the projections 411 and correspondingly shaped so as to receive the projections as the rolls are rotated in opposite directions. As the composite sheet material passes between the rolls 401, 402, the material is driven by the projections 411 into the recesses. As shown in FIG. 9, the projections each include an outermost surface portion that is positioned for contacting a discrete portion of the sheet material and for entering a corresponding recess on the opposite roll. As a result, the sheet material is incrementally stretched by deep embossing in discrete areas or zones surrounding the point of contact by the projection as the projection and the sheet material enter into a corresponding recess.

As noted above, stretching of the composite sheet material subjects portions of the sheet to tensile stress in one or more directions. In the absence fibers and filaments that are extensible, the application of stress may cause the composite to rupture or tear. As a result, the composite sheet material may be unacceptable for its intended purpose. The layer(s) of continuous extensible filaments and the layer(s) of extensible coform enable the composite sheet material to withstand the stresses that may be encountered during stretching. In preferred embodiments of the present invention, the composite sheet material can be stretched at least 150% without rupture of the coform layer(s). A suitable procedure for testing whether a sample can be stretched to this extent involves incrementally stretching the sample in the cross direction by ring-rolling using rolls with circumferentially extending rings. By adjusting the depth of engagement of the rings, the percent elongation can be controlled. As shown in FIG. 10, given the spacing 2A between adjacent rings and the depth of engagement of the rings B, the percent elongation of the material can best be approximated by the formula:

$$\% \text{ Elongation} = (\sqrt{(A^2+B^2)} - A)/A \times 100$$

The absorbency and rate of absorption of the composite sheet material can be increased by treating the surface layers with surfactants. Triton X-102 from Dow Chemical Company, Silastol PST from Schill and Seilacher AG and Nuwet 237 from General Electric are examples of suitable surfactants.

FIG. 11 illustrates yet another embodiment of the invention wherein the composite sheet material, designated by reference number 10", comprises outer layers 14 in the form of spunbond nonwoven webs of substantially continuous extensible filaments disposed on opposite sides of an interior coform layer 12. However, in other embodiments, the layers 14 could comprise webs of staple fibers or webs of meltblown fibers. In the embodiment shown in FIG. 11, the two spunbond nonwoven layers 14 are attached to opposite surfaces of the extensible coform layer 12 and define the exterior surfaces 16 of the composite sheet material. The interior coform layer 12 provides an absorbent core to the composite sheet material that is capable of retaining a desired volume of fluids.

The three-layered composite sheet material 10" of FIG. 11 may be produced by an apparatus similar to that shown in FIG. 3, except that the apparatus includes an additional spunbond station substantially similar to the one indicated by the reference character 120 located upstream of the first coform station 110 so that a spunbond layer is initially deposited onto the collection surface 114 and the coform station 110 would thus deposit the coform layer directly onto the thus-formed spunbond layer. Then a second spunbond layer would be deposited by the spunbond station 120. For producing a three-layered laminate, the second coform station 130 shown in FIG. 3 would be inactive. If a four-layered composite sheet material is desired having a coform layer on one of the outer surfaces, the second coform station 130 could be activated.

The composite sheet material of the invention may be useful in a wide variety of applications including personal hygiene products, wet and dry wipes, diapers and incontinent garments. The composite sheet material is particularly useful as an absorbent wipe, such as a wet-wipe. In the context of the invention, the term "wet wipe" refers to a fibrous sheet which has a liquid applied thereto so that the liquid can be retained on or within the fibrous sheet until its utilization by a consumer. The liquid can be any solution which can be absorbed into the wet-wipe composite elastic material and may include any suitable components which provide the desired wiping properties. For example, the components may include water, emollients, surfactants, fragrances, preservatives, chelating agents, pH buffers or combinations thereof as are well known to those skilled in the art. The liquid may also contain lotions and/or medicaments. The amount of liquid contained within each wet-wipe may vary depending upon the type of material being used to provide the wet-wipe, the type of liquid being used, the type of container being used to store the wet-wipes, and the desired end use of the wet-wipe. Generally, each wet-wipe can contain from about 150 to about 600 weight percent and preferably from about 250 to about 450 weight percent liquid based on the dry weight of the wipe for improved wiping. In a more preferred aspect, the amount of liquid contained within the wet-wipe is from about 300 to about 400 weight percent and desirably about 330 weight percent based on the dry weight of the wet-wipe. If the amount of liquid is less than the above-identified ranges, the wet-wipe can be too dry and may not adequately perform. If the amount of liquid is greater than the above-identified ranges, the wet-wipe can be oversaturated and soggy and the liquid may pool in the bottom of the container.

Examples

Coform fabrics of varying extensibility were produced using meltblown fibers with various blend ratios of polypropylene homopolymer (Basell Metocene X-11291491) and elastic polypropylene copolymer (ExxonMobil Vistamaxx 2320). The blends were processed in a 5 cm diameter single screw extruder and fed to a meltblowing die capable of producing a web 25 cm in width. The temperature of the die was 270° C. and the temperature of the draw air was 215° C. A pulp fiberizer similar in design to the fiberizer described in U.S. Pat. No. 3,793,678 is used to fiberize Weyerhaeuser NF 405 pulp and propel it into the meltblown web approximately 8 cm below the meltblowing die tip. One coform fabric sample was prepared using meltblown fibers prepared from polyethylene (Dow DNDA-1082). All fabrics had a basis weight of 65 gsm (grams per square meter) and a meltblown content of 40%. These coform webs were thermal point bonded at a speed of 10 m/min using a 4% bond area roll. The fabrics with PP meltblown were bonded at a temperature of 128° C. The fabric with PE meltblown was bonded at a temperature of 115° C.

The extensibility of these fabrics was evaluated by the following procedure, and the results are summarized in Table 1: The bonded webs were passed through a set of ring rollers that were set to various depths of engagement. The fabrics were incrementally stretched in the cross machine direction. The spacing between the rings was 1.6 mm. The depth of engagement varied from 0 mm to 3.4 mm. The fabrics were tested at gradually increasing penetration depths until they shredded. The elongation of the fabrics in the incremental stretcher was determined by trigonometry. The highest depth of engagement reached by a fabric before it shreds is used to determine its elongation. The coform webs with elongations of 150% or greater are particularly advantageous for this invention.

TABLE I

Coform Elongation by CD Incremental Stretching

| Meltblown Composition | Elongation % |
|---|---|
| 100% PP | 33 |
| 20% ePP 80% PP | 67 |
| 40% ePP | 83 |

TABLE I-continued

Coform Elongation by CD Incremental Stretching

| Meltblown Composition | Elongation % |
|---|---|
| 60% PP | |
| 60% ePP | 150 |
| 40% PP | |
| 80% ePP | 180 |
| 20% PP | |
| 100% PE | 150 |

PP = polypropylene homopolymer (Basell Metocene X-11291491)
ePP = elastic polypropylene copolymer (Vistamaxx 2320)
PE = polyethylene (Dow DNDA-1082)

Drapeability

The drapeability of five coform samples was evaluated. All samples were tested in a FRL Cantilever Bending Tester manufactured by TMI (reference: ASTM D 1388-96). Samples 2.5 cm wide by 20 cm long (the long direction being the machine direction) are placed on a smooth surface under a heavy metal weight. The weight is mechanically driven over the top of the smooth surface, carrying the fabric with it. The weight and the fabric beneath it extend over the edge of the smooth surface. The fabric sample slowly bends, and at the point of 45° bend the extension of the weight over the edge of the smooth surface is recorded. Stiff fabrics require the weight to travel a greater distance before they bend to 45°. The distance of travel for the weight for each sample is given in Table V. The advantage of incremental stretching in improving drapeability is clearly evident.

TABLE II

Drape of Coform Samples

| Sample | Meltblown Composition | Basis Weight gsm | Drape Length cm |
|---|---|---|---|
| A | 20/80 PP/Vistamaxx 2320 | 65 | 6.4 |
| B | 20/80 PP/Vistamaxx 2320 Incrementally Stretched | 66 | 4.1 |
| C | PE | 67 | 4.1 |
| D | PE Incrementally Stretched | 70 | 2.2 |
| E | PP | 65 | 8.9 |

TABLE III

Description of Coform Samples

| Sample | Composition |
|---|---|
| A | 65 gsm coform, 40% meltblown fibers of a 20/80 PP/Vistamaxx 2320 blend. Thermal point bonded with a 4% pattern. |
| B | 130 gsm coform, 40% meltblown fibers of a 20/80 PP/Vistamaxx 2320 blend. Thermal point bonded with a 4% pattern. Incrementally stretched to 180% elongation in both the MD and CD. Basis weight after incremental stretching - 66 gsm. |
| C | 67 gsm Coform web, 40% PE meltblown. Thermal point bonded with 4% pattern. |
| D | 112 gsm Coform web, 40% PE meltblown. Thermal point bonded with a 4% pattern. Incrementally stretched to 150% elongation in both the MD and CD. Basis weight after incremental stretching - 70 gsm. |
| E | 65 gsm Coform, 40% PP meltblown fibers. Thermal point bonded with a 4% pattern. |

TABLE IV

Tensile Properties of Coform Samples

| Sample | MD Tensile N/5 cm | CD Tensile N/5 cm |
|---|---|---|
| A | 4.5 | 3.5 |
| B | 3.2 | 3.2 |
| C | 3.8 | 2.2 |
| D | 3.3 | 2.6 |
| E | 14.2 | 9.5 |

Coform/Spunbond Laminates

Table IV reveals that the most drapeable coform fabrics have relatively low tensile strengths. Because these fabrics contain thermoplastic fibers, it is possible to thermally laminate them to other nonwovens in order to increase their strength. If these nonwovens are extensible, the resulting laminates can be mechanically stretched to increase their softness. This possibility is demonstrated by the set of examples given in Table V. For samples F through L, the coform webs were thermal point bonded to spunbond webs at a speed of 10 m/min using a 4% bond area roll. The Sofspan® spunbonded fabric used in these samples was prepared according to U.S. Pat. No. 5,593,768. The fabrics with PP meltblown were bonded at a temperature of 128° C. The fabric with PE meltblown was bonded at a temperature of 115° C.

The extensibility of these laminates was evaluated by the incremental stretching technique. Laminates made using 100% PP meltblown were not extensible to 150% and therefore did not meet the criterion for this invention.

TABLE V

EXTENSIBILITY OF COFORM/SPUNBOND COMPOSITES

| Sample | Coform Meltblown Component 40% Meltblown in 60% Wood Pulp | Spunbond Component | Extensibility % |
|---|---|---|---|
| F | 100% PP Meltblown 65 gsm | 100% PP Spunbond 10 gsm | 110 |
| G | 40/60 PP/ePP Meltblown 65 gsm | 100% PP Spunbond 10 gsm | 220 |
| H | 20/80 PP/ePP Meltblown 65 gsm | 100% PP Spunbond 10 gsm | 220 |
| I | 100% PP Meltblown 65 gsm | Sofspan ® 15 gsm | 110 |
| J | 40/60 PP/ePP Meltblown 65 gsm | Sofspan ® 15 gsm | 265 |
| K | 20/80 PP/ePP Meltblown 65 gsm | Sofspan ® 15 gsm | 265 |
| L | 100% PE Meltblown 45 gsm | 100% PE Spunbond 15 gsm | 340 |
| M | | 100% PP Spunbond 10 gsm | 180 |
| N | | Sofspan ® 15 gsm | 340 |
| O | | 100% PE Spunbond 15 gsm | 340 |

As Table VI indicates, the strength of the laminates makes them more suitable for applications in which durability is important. As Table VII indicates, stretching the laminates improves their softness and drape.

TABLE VI

PROPERTIES OF COFORM/SPUNBOND COMPOSITES
BEFORE INCREMENTAL STRETCHING

| Sample | Basis Weight gsm | MD Tensile N/5 cm | CD Tensile N/5 cm | Drape cm |
|---|---|---|---|---|
| F | 75 | 30 | 17 | 12 |
| G | 75 | 20 | 14 | 7 |
| H | 75 | 21 | 11 | 6 |
| I | 80 | 36 | 22 | 7.5 |
| J | 80 | 31 | 18 | 7.5 |
| K | 80 | 26 | 15 | 6.25 |
| L | 60 | 14 | 7.5 | 3.25 |

TABLE VII

PROPERTIES OF COFORM/SPUNBOND COMPOSITES
AFTER INCREMENTAL STRETCHING TO >150% ELONGATION

| Sample | Basis Weight gsm | MD Tensile N/5 cm | CD Tensile N/5 cm | Drape cm |
|---|---|---|---|---|
| F | Shreds | | | |
| G | 48 | 13 | 11 | 4 |
| H | 53 | 16 | 8.5 | 3.25 |
| I | Shreds | | | |
| J | 56 | 21 | 8 | 2 |
| K | 51 | 19 | 7 | 2.75 |
| L | 26 | 4 | 3.5 | 1.5 |

Trilaminates of Coform with Spunbond Fabrics

Trilaminates of coform with spunbond webs have performance advantages, especially in the area of durability. The coform webs described in Table VIII were prepared. Samples P and Q were to be evaluated as unlaminated coform fabrics. Samples R, S & T were prepared at lower basis weights and were designed to be incorporated into laminates with extensible spunbond fabrics.

TABLE VIII

Coform Webs

| Sample # | PP Weight gsm | Vistamaxx Weight gsm | Pulp Weight gsm | Total Basis Weight gsm |
|---|---|---|---|---|
| P | 26 | | 39 | 65 |
| Q | 10 | 16 | 39 | 65 |
| R | 8 | 10 | 27 | 45 |
| S | 3.5 | 5 | 14 | 22.5 |
| T | 8.5 | | 14 | 22.5 |

Web samples P and Q were thermally point bonded in a heated calender using a smooth roll and a point embossed roll with 4% bond area at a temperature of 128° C. and at a speed of 10 meters per minute.

Preparation of Coform Laminates

Using coform web samples R, S and T the following three layer laminates are prepared in the point bonding calender at a temperature of 127° C. and at a speed of 10 meters per minute. The laminates described in Table IX were prepared with spunbonded fabric made from either PP homopolymer or high elongation (Sofspan®) spunbond fabric, which is described in U.S. Pat. No. 5,593,768.

TABLE IX

Coform/Spunbond Laminates

| Laminate # | Layer 1 | Layer 2 | Layer 3 | Basis Weight gsm |
|---|---|---|---|---|
| 1 | 15 gsm Sofspan® | Coform Sample R | 15 gsm Sofspan® | 75 |
| 2 | Coform Sample S | 25 gsm Sofspan® | Coform Sample S | 70 |
| 3 | Coform Sample T | 15 gsm PP SB | Coform Sample T | 60 |
| 4 | 15 gsm PP SB | Coform Sample T | 15 gsm PP SB | 52.5 |

Incremental Stretching of Coform and Coform Laminates

The bonded samples described in Table I and Table II are passed in the machine direction through an incremental stretching apparatus to an elongation of 150%. The result of this operation is to stretch the fabrics in the cross machine. The samples were then turned 90° and passed through the incremental stretching apparatus. The result of this operation is to stretch the fabrics in the machine direction. The samples with made using PP homopolymer in both the spunbond and meltblown components shredded during incremental stretching and therefore did not meet the criterion for this invention.

TABLE X

Basis Weight of Incrementally Stretched Samples

| Sample | Basis Weight Before Stretching gsm | Basis Weight After MD and CD Stretching gsm |
|---|---|---|
| P | 65 | Shredded |
| Q | 65 | 52 |
| Laminate 1 | 75 | 61 |
| Laminate 2 | 70 | 58 |
| Laminate 3 | 60 | Shredded |
| Laminate 4 | 52.5 | Shredded |

Drapeability

All of the thermal point bonded samples and the incrementally stretched samples were tested in a FRL Cantilever Bending Tester manufactured by TMI (reference: ASTM D 1388-96). Samples 2.5 cm wide by 20 cm long (the long direction being the machine direction) are placed on a smooth surface under a heavy metal weight. The weight is mechanically driven over the top of the smooth surface, carrying the fabric with it. The weight and the fabric beneath it extend over the edge of the smooth surface. The fabric sample slowly bends, and at the point of 45° bend the extension of the weight over the edge of the smooth surface is recorded. Stiff fabrics require the weight to travel a greater distance before they bend to 45°. The distance of travel for the weight for each sample is given in Table V. The advantage of using extensible components is evident in that sample Q has better drape than sample P, which has been prepared using PP homopolymer. Similarly, laminates 1 and 2 which are prepared from extensible components have better drape than laminates 3 and 4, which have been prepared using a coform component which is not extensible. In all the samples prepared from extensible components, the drape is further improved by the incremental stretching step.

TABLE XI

Drape of Fabric Samples

| Sample | Drape Length |
|---|---|
| P | 8.25 |
| Q | 6.5 |
| Laminate 1 | 5.75 |
| Laminate 2 | 5.0 |
| Laminate 3 | 8.25 |
| Laminate 4 | 7.5 |
| Q* | 4.5 |
| Laminate 1* | 4.0 |
| Laminate 2* | 4.0 |

*MD and CD incrementally stretched

Durability

The samples were tested for abrasion durability in the Taber abrasion tester equipped with CS-10 rubber abrasion wheels. A sample 12 cm in diameter is rotated and two abrasion wheels turn on its surface. The number of rotations until a hole is produced in the sample is recorded. The results are given in Table XII. The advantage of incorporating spunbond filaments in the composite is evident. However, incrementally stretching the composite decreases abrasion resistance somewhat.

TABLE XII

Physical Properties of Bonded Coform Webs and Coform/Spunbond Laminates

| Sample | MD Tensile N/5 cm | CD Tensile N/5 cm | Thickness mm | Taber Abrasion Cycles |
|---|---|---|---|---|
| P | 14 | 9.5 | 0.78 | <10 |
| Q | 10 | 6 | 0.75 | <10 |
| Laminate 1 | 29 | 16 | 0.95 | >200 |
| Laminate 2 | 36 | 16 | 0.70 | >200 |
| Laminate 3 | 15 | 9 | 0.72 | >200 |
| Laminate 4 | 24 | 13 | 0.69 | >200 |
| Q* | 5.5 | 3.5 | 0.62 | <10 |
| Laminate 1* | 15 | 9 | 0.75 | 125 |
| Laminate 2* | 19 | 9 | 0.61 | 85 |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An extensible composite sheet material comprising a first layer formed of a coformed blend of absorbent fibers and extensible, inelastic meltblown fibers and a second layer of extensible, inelastic thermoplastic fibers, in which the meltblown fibers of the first layer and the extensible thermoplastic fibers of the second layer have been permanently elongated.

2. The extensible composite sheet material of claim 1, wherein the second layer of extensible thermoplastic fibers comprises a nonwoven web.

3. The extensible composite sheet material of claim 2, wherein the nonwoven web is a spunbond web comprised of continuous filaments.

4. The extensible composite sheet material of claim 2, wherein the nonwoven web is a carded web of staple fibers.

5. The extensible composite sheet material of claim 2, wherein the nonwoven web is a meltblown web of meltblown fibers.

6. The composite sheet material of claim 1, wherein the meltblown fibers of the first layer are comprised of polyethylene.

7. The composite sheet material of claim 1, wherein the meltblown fibers of the first layer are comprised of blends of polypropylene homopolymer and polypropylene copolymer.

8. The extensible composite sheet material of claim 1, wherein the extensible thermoplastic fibers of the second layer are prepared from a propylene polymer or copolymer.

9. The extensible composite sheet material of claim 1, wherein extensible thermoplastic fibers of the second layer comprise polyethylene continuous filaments.

10. The extensible composite sheet material of claim 1, wherein the extensible thermoplastic fibers of the second layer comprise a blend of at least two polymers which are immiscible with one another and at least one additional polymer which is miscible or partially miscible with said immiscible polymers.

11. The extensible composite sheet material of claim 10, wherein said blend of immiscible polymers comprises a propylene polymer and polyethylene.

12. The extensible composite sheet material of claim 1, wherein the extensible thermoplastic fibers of the second layer comprise multicomponent filaments.

13. The extensible composite sheet material of claim 1, wherein the extensible thermoplastic fibers of the second layer comprise sheath-core bicomponent filaments including a polyethylene sheath component and a polypropylene core component.

14. The extensible composite sheet material of claim 1, wherein functional particulate have been incorporated into the blend of absorbent fibers and meltblown fibers.

15. The extensible composite sheet material of claim 1, in which an additional layer of continuous extensible filaments is in intimate surface-to-surface contact with an opposite side of said coform layer and bonded thereto so that the additional layer of continuous extensible filaments defines an opposite exterior surface of the composite sheet material.

16. The extensible composite sheet material of claim 1, in which an additional layer formed of a coformed blend of absorbent fibers and extensible meltblown fibers is in intimate surface-to-surface contact with an opposite side of said layer of extensible thermoplastic fibers so that the additional layer defines an opposite exterior surface of the composite sheet material.

17. The extensible composite sheet material of claim 1, in which the meltblown fibers of the first layer and the extensible thermoplastic fibers of the second layer have been permanently elongated by the application of tensile stress.

18. The extensible composite sheet material of claim 17, which has been stretched by ring-rolling to permanently elongate the fibers and filaments.

19. The extensible composite sheet material of claim 17, which has been stretched by deep embossing to permanently elongate the fibers and filaments.

20. An extensible composite sheet material comprising a first layer formed of a coformed blend of absorbent fibers and extensible, inelastic meltblown fibers that have been permanently elongated by the application of tensile stress, and wherein the sheet material has been permanently elongated by 150% or greater of the sheet material's original length.

21. The extensible composite sheet material of claim 20 which has been stretched by ring-rolling to permanently elongate the extensible meltblown fibers.

22. The extensible composite sheet material of claim 20 which has been stretched by deep embossing to permanently elongate the extensible meltblown fibers.

23. An extensible composite sheet material comprising a first layer formed of a coformed blend of absorbent fibers and extensible, inelastic meltblown fibers that have been permanently elongated by the application of tensile stress, wherein the meltblown fibers of the first layer have been permanently elongated by 150% or greater of their original lengths.

24. An extensible composite sheet material comprising a first layer formed of a coformed blend of absorbent fibers and extensible, inelastic meltblown fibers and a second layer of extensible, inelastic thermoplastic fibers, wherein the first and second layers are joined to each other via thermally bonding such that the first and second layers define discrete layers in the composite sheet material, in which the meltblown fibers of the first layer and the extensible thermoplastic fibers of the second layer have been permanently elongated by the application of tensile stress.

25. The extensible composite sheet material of claim 24, wherein the second layer comprises a spunbond nonwoven web.

26. The extensible composite sheet material of claim 24, wherein the first and second layers are point bond to each other.

* * * * *